United States Patent [19]

Atchley

[11] 3,838,664
[45] Oct. 1, 1974

[54] DEMAND DELIVERY DEVICE FOR WATERING SMALL BIRDS
[75] Inventor: Frank W. Atchley, Napa, Calif.
[73] Assignee: Atco Manufacturing Company Inc., Napa, Calif.
[22] Filed: Apr. 23, 1973
[21] Appl. No.: 353,444

[52] U.S. Cl. ............................................ 119/72.5
[51] Int. Cl. ............................................. A01k 7/00
[58] Field of Search .......... 119/72.5, 75, 72, 71, 18

[56] References Cited
UNITED STATES PATENTS

| | | | |
|---|---|---|---|
| 2,307,220 | 1/1943 | Hewitt ............................... | 119/72.5 |
| 3,228,377 | 1/1966 | Grassano ........................... | 119/72.5 |
| 3,566,844 | 3/1971 | Occhiodori et al. ................ | 119/72.5 |
| 3,669,077 | 6/1972 | Spierenburg ....................... | 119/72.5 |

FOREIGN PATENTS OR APPLICATIONS 1,129,017  10/1968  Great Britain

Primary Examiner—Hugh R. Chamblee
Attorney, Agent, or Firm—James R. Cypher

[57] ABSTRACT

A device for watering small caged birds, as canaries and parakeets, comprised of a closed water container and a self-service water dispensing device. The invention consists of a unique double ball device utilizing a combination of natural forces, including gravity, air pressure, and surface tension phenomena, to regulate the water release. One of the ball members functions as a pump piston, not as a valve; the other ball serves as a weight and also controls the entry of air to the container. A metered amount of water is forcefully pumped out of the unit and made available to the bird by ball movement and corresponding volumetric liquid displacement.

8 Claims, 12 Drawing Figures

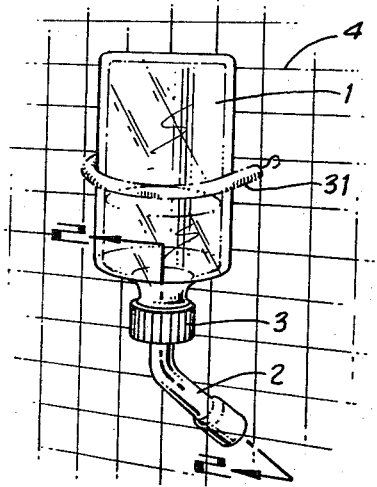
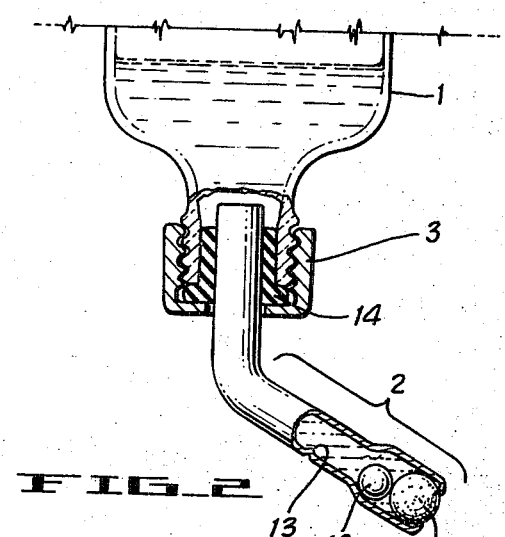
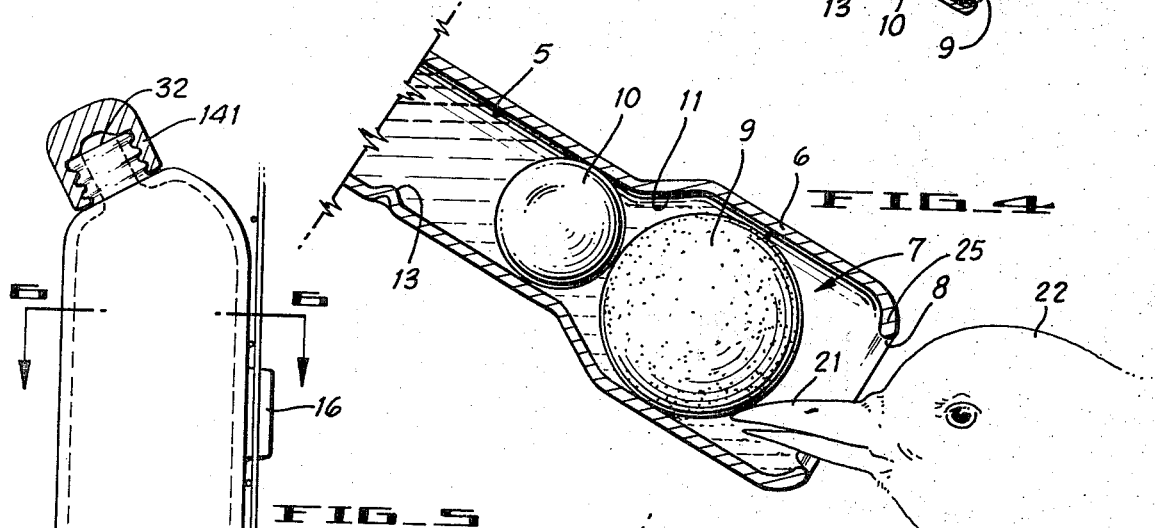
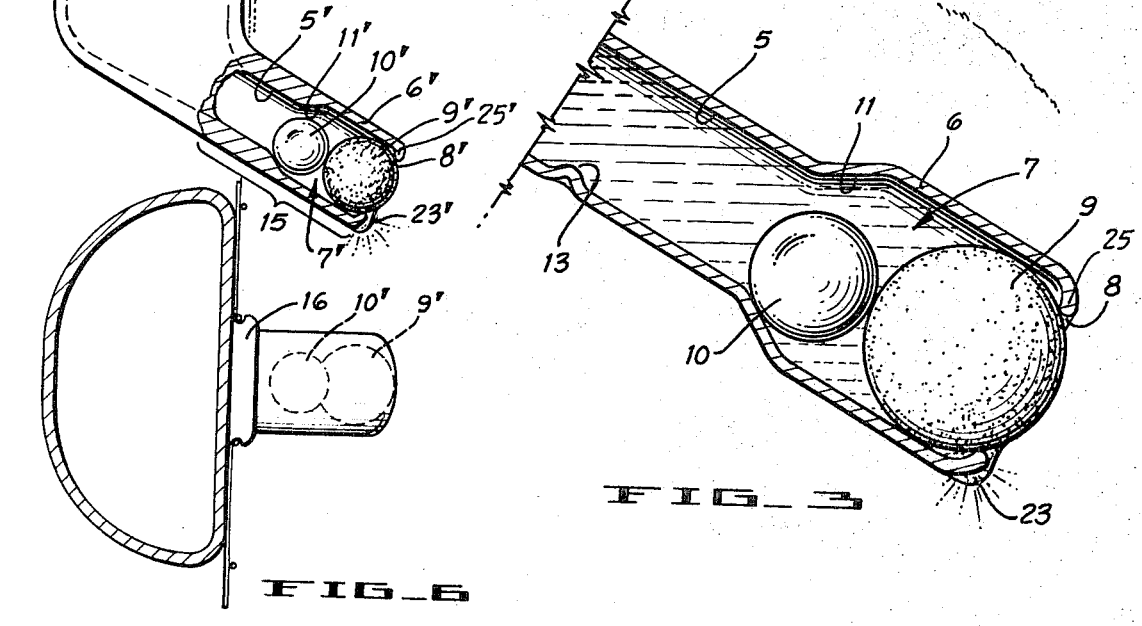
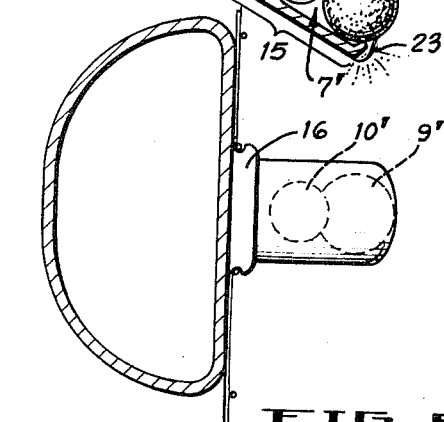

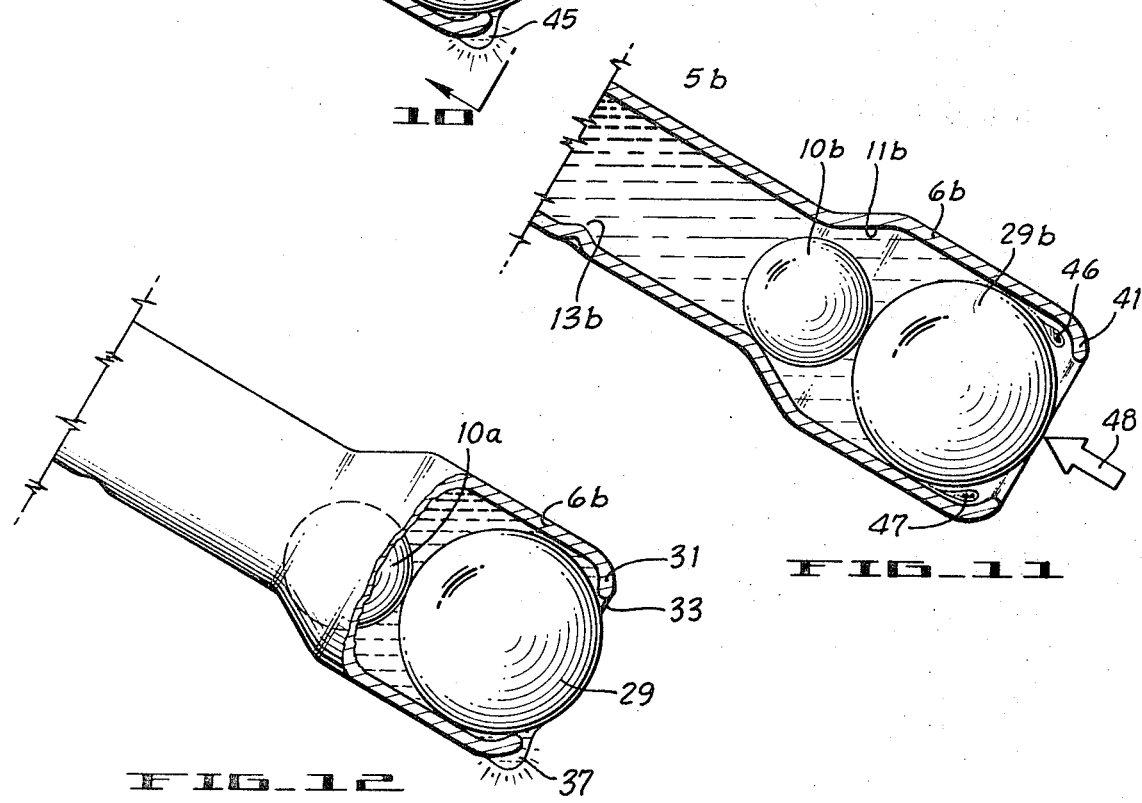

3,838,664

DEMAND DELIVERY DEVICE FOR WATERING SMALL BIRDS

BACKGROUND OF THE INVENTION

Watering small caged birds, as canaries and parakeets with conventional open containers involves problems of water evaporation, stagnation, pollution, contamination, spillage, and the need for continual water change and container cleaning. In open containers, the water is exposed to the environment and is unavoidably subject to pollution with bird excreta, feathers, food particles, residual bacterial contamination, and bird splashing, playing and bathing. The result is continual cumulative degradation of water quality, messy wet cages, objectionable odor from damp excreta on the cage floor, general unsanitary condition of bird care, and attending maintenance requirements involving frequent water change, human vigilance, physical effort, and monetary cost.

Presently available closed container bird watering devices which have a tube connected to the underside of the container are unsatisfactory in several respects. First, changes in temperature and pressure may result in a withdrawal of the liquid from the mouth of the tube so that the bird is unable to restart the flow of liquid. Secondly, since present devices work entirely upon the principle of vacuum in the container and surface tension in the tube, a bird can cause a continuous flow by merely inserting its beak through the water surface, breaking the surface tension, and possibly start a flow exceeding its capacity to drink the flow. Flooding of the cage can result. In any event, such devices sometimes continue to flow after the bird withdraws its beak until equilibrium of the vacuum in the container with the outside atmosphere can be re-established.

Prior art reveals nothing has been provided for dispensing water to birds from a portable, closed container via a control device that functions as a pump and delivers a non-continuous water release. By dispensing water on demand from a closed container, without continuous flow, the invention effectively eliminates the many problems of watering small birds with open containers.

SUMMARY

A portable water dispensing device for small birds utilizing a closed container adapted for dispensing a non-continuous flow of water is provided. The non-continuous water dispensing is accomplished by a fluid pumping system which utilizes a piston and equilibrium of natural forces, not by valve or gate action. The natural forces so utilized include intrinsic material properties, molecular forces within liquids, force of gravity, differential air pressure, and mechanical mass movement. The water dispensing member serves to disrupt the natural equilibrium control through physical mass movement and by volumetric displacement of liquid. Water is forced out of the container by pumping and made available to the bird by movement of the piston member by pecking action. The device is effectively fail safe since it utilizes a pump and natural forces to control the fluid flow, not a mechanical valve action.

DESCRIPTION OF THE DRAWINGS

The foregoing objective and accomplishments of the present invention will become more clearly apparent in the following description when considered in conjunction with the appended drawings.

Referring to the drawings:

FIG. 1 is a perspective view of the invention as it would appear fully assembled and mounted on the bird's cage.

FIG. 2 is a partial fragmentary cut-away elevational view of the invention showing internal and external details of the construction and positioning of the various elements.

FIG. 3 is a medial cross-sectional elevational view of the dispensing device showing the double ball pump in a down, full-closed position.

FIG. 4 is a medial cross-sectional view of the bulbous end of the dispensing device showing the positioning of the double ball pump in a full inward position.

FIG. 5 is a partially cut-away side elevational view of a possible modification of the invention, illustrating one of many ways the exterior shape and positioning of elements can be changed without departing from the scope of the invention.

FIG. 6 is a horizontal section of the closed water container illustrated in FIG. 5, showing details of wedge attachment to the bird's cage.

FIG. 7 is a cross sectional view of another form of the invention.

FIG. 8 is an end view of the device of FIG. 7.

FIG. 9 is a cross section of another form of the invention.

FIG. 10 is an end view of the device shown in FIG. 9.

FIG. 11 is a partial side view of the device shown in FIG. 7 with portions removed to show the position of the balls in the closed position.

FIG. 12 is a side view of the device shown in FIG. 7 with portions in cross section showing the device in the non-activated position.

BRIEF DESCRIPTION OF THE PREFERRED EMBODIMENTS OF THE INVENTION

The device of the present invention consists briefly of a closed liquid container 1; a conduit 5 connected to a lower portion of the container; a chamber 7 communicating with the conduit and having an opening 8 communicating with the atmosphere; a spherical member 9 mounted in the chamber adapted for movement by the beak 21 of a small bird 22 from a first non-flow position (as shown in FIG. 3) to a second flow position (as shown in FIG. 4) thereby displacing and dispensing by forcing a metered volume of liquid; and a ballast member 10 operatively connected to the spherical member moveable from a first flow position (see FIG. 3) in the chamber to a second non-flow position (see FIG. 4) in the conduit upon a corresponding movement of the member.

The liquid dispensing device is further characterized by the spherical and ballast members being mounted for axial reciprocation within the conduit and the chamber; the conduit and chamber having a circular cross section; the spherical member and ballast generally spherical; the chamber having a relatively greater inside cross sectional area than the conduit; the spherical member having a relatively greater cross sectional area than the ballast member; the ballast member being relatively greater in weight than the spherical member; the distal end of the chamber having a circumferential constricted opening 25 wherein the opening of the chamber to atmosphere is smaller than the diameter of the spherical member and permits only a portion of the piston member to protrude beyond the chamber; the surface of the spherical member is formed with an irregular surface to prevent mechanical seal with the constricted opening; the difference in the cross sectional area of the spherical member and the chamber is dimensioned to permit interchange of air and water when the piston member moves from the first to the second position; the conduit and chamber are positioned on an angle with the horizontal so that the piston will return to the first position by gravity force due to the weight of the ballast member; and the chamber is dimensioned so that when drinking, a bird will normally push the piston to the second position and the ballast member will normally be moved to the second position and each repetition of the cycle of movement of the members will provide sufficient water for the bird to repeat the cycle yet will provide a regulated amount of water that will not exceed the bird's ability to drink the water in the chamber without drippage.

FIG. 1 reveals that the preferred embodiment of this invention comprises an inverted closed water container, an elongated water dispensing device 2, a screw cap closure 3 for attaching the water dispensing device 2 to the water container 1, and a coiled tension spring 31 for detachably mounting the assembled unit to the bird's cage 4.

FIG. 2 reveals the details of assembly and positioning of component elements. As shown, the water dispensing device 2 is detachably and sealably affixed to the water container 1 with a threaded cap 3 and internal resilient seal 14.

FIG. 3 reveals the water dispensing device is an assembly comprised of an elongated tubular conduit 5 having a swelled-out, bulbous end portion 6 forming a cylindrical internal chamber 7 with a constricted open distal end 8. Positioned inside the cylindrical chamber 7 is a spherical piston member 9 adapted to substantially close the distal end opening 8 under influence of gravity in a downward tilted angle. The spherical piston member 9 is adapted to preclude fluid seal with the constricted end of the bulbous chamber 6 with an unpolished, irregular, indented surface. Wedging action between the piston and the constricted end is accomplished by forming end 25 with a curved radius smaller than the radius of the spherical piston member 9. The bulbous housing 6 is adapted to precisely delimit the inward movement of the spherical piston ball 9 to point 11 from bird pecking action for dispensement of a fixed unit volume of water by mass volumetric displacement. The spherical member 9 is provided with brilliant color to aid in attracting the birds and avoiding training difficulty.

FIG. 3 and 4 reveal a spherical ballast member 10 positioned inwardly from piston member 9 and within the tubular housing 5. The ballast member 10 augments the force of gravity and serves to assist and urge the piston member 9 downwardly to close off the constricted distal end opening 8. A dimple identation 13 is provided in housing wall 5 to detain the ballast member 10 in the lower portion of the conduit.

FIGS. 3 and 4 further reveal that the tubular housing 5, bulbous section 6, and constricted distal end opening 8 are adapted for non-sealing closure with the piston member 9 in both the normal full-down closed position and in the full-inward open position. In intermediate positions, a substantial radial opening, or separation, exists between the piston member 9 and the interior wall of bulbous housing 6.

FIG. 4 illustrates how water is physically displaced down out of chamber 7 by inward deflection of piston member 9 through bird pecking action. Water so displaced collects at the constricted portion of the distal end opening 8 and is consumed by the bird.

FIGS. 5 and 6 illustrate possible modifications in shape, arrangement, and positioning of the various elements of the invention. As shown, the closed container refill opening 32 is in an upright position with a separate detachable closure 141. The detachable, separate dispensing device assembly 2 is changed to an elongated housing 15 which is an integral part of the water container. The coiled tension spring 31 for detachably mounting the assembled unit to the bird's cage is changed to a tapered wedge member 16 for mounting the unit on the cage. This tapered wedge member 16 utilizes the spring tension of the cage wires to hold the unit in position. Other members and parts of the device are designated by identical numbers followed by the prime mark (').

Referring collectively to the drawings and foregoing description it becomes apparent that the invention does indeed constitute a closed container, self-service watering unit for birds. From analysis of the operating principles involved, it becomes clear that water does not flow out of the assembled dispensing device 2 under force of gravity because of equilibrium of force between vacuum pressure inside the container and air pressure outside the container with the force of surface tension of the water meniscus 36 bridging the gap between the piston member 9 and the tubular housing wall 5. It is also clear that inward deflection of the spherical 9 from its normal full-down position accomplishes two things: first, it physically forces water down out of chamber 7 by mass volumetric displacement; and second, it mechanically decreases the force of surface tension around the control member by increasing the net area of opening available for water passage. The displacement of water down out of the container coupled with the net reduction in force of surface tension disrupts the normal equilibrium of forces and allows air to enter around the spherical member 9 and pass up into the closed container and restore equilibrium.

The dimension of the control balls and the length of the chamber are dimensioned so that after a substantial portion of the water in the chamber has been displaced by the first spherical member and air has been permitted to pass up the conduit to the storage container, the ballast member will be displaced into the conduit. The conduit and ballast ball are more closely toleranced and although there is no mechanical seal formed between the ballast ball and the conduit wall, yet, with the reduced pressure in the container; no water can come down through the conduit. Thus the flow of water will be stopped and as soon as the bird drinks the water from the chamber, he will withdraw his beak.

When the bird's beak is withdrawn, the weight of the ballast ball will force the piston ball down to the end of the chamber. The weighted ball with pull water down the conduit due to surface tension with the ball and as soon as the ball enters the wide chamber, the surface tension will be reduced and water will flow around the ballast ball and fill the chamber around and behind the piston ball. Since there is no mechanical seal between the spherical ball and the end of the chamber, air can flow out of the chamber to atmosphere and thus permit the chamber to fill with liquid. A small amount of water will flow past the first ball and the end of the chamber because of the uneven surface of the ball and a drop of water will form on the outside of the chamber as shown at number 23 on FIG. 3. All flow will stop and no dripping will occur as soon as the surface tension between the piston and the end of the chamber plus the vacuum in the container equal the weight of the water column. This water drop serves to attract the bird to drink and encourage it to stick its bill in the chamber thus starting or repeating the cycle.

The resulting water flow is non-continuous and available only upon inward deflection of the control member. Mechanical seal between the control member 9 and the housing 5 is purposely excluded in order to allow the escape of water and avoid build-up of pressure inside the closed container from air expansion on temperature increase by limited drippage. Without this ability to compensate for pressure change inside the closed container, the control ball 9 could become inoperable by the bird since the pressure in the container would hold the ball against the stricture in the end of the conduit.

Thus, it is shown that the present invention does constitute a simple, safe, practical, useful new device for watering small birds. It is a portable, sanitary, closed container bird watering unit. The illustrations and descriptions reveal the means, adaptations, and positioning of various described components for accomplishing the stated objectives of the invention. As indicated, it is entirely possible that various changes and modifications can be made in the details thereof without departing from the spirit and scope of the invention as set forth in the following claims.

As specific examples, I provide the device in three different sizes. For large birds such as cockatoos, mina birds and pet crows the conduit inside diameter is 0.395 with a small ball size of 0.375. The chamber inside diameter is 0.465 and the large ball diameter is 0.437. The chamber is approximately 0.400 inches long.

For medium size birds such as parakeets, the conduit diameter inside is 0.283 with a small ball size of 0.250. The chamber inside diameter is 0.400 and the large ball diameter is 0.375. The chamber is approximately 0.450 inches long.

For small birds such as canaries and finches, the conduit inside diameter is 0.283 with a small ball size of 0.250. The chamber inside diameter is 0.352 and the large ball diameter is 0.313. The chamber is approximately 0.390 inches long.

Another form of the invention is shown in FIGS. 7 and 8. The device is constructed identically to the device shown in FIGS. 1 – 4 as to those parts indicated by the letter "a" after the number. The only differences are as follows. Instead of the piston member being stippled, a smooth surfaced piston member 29 is provided. Member 29 is preferably spherical and may be made of any plastic material which has a hydrophillic surface. The surface must be capable of forming a meniscus with the side wall of the conduit. In order to prevent pressure locking of the member 29 against the restricted portion 31, a ring of crenulations 32 are formed therein. Thus the crenulations preclude any mechanical seal between member 29 and the constricted end of the tube 31. Sealing is effected by the combination of the surface tension of the liquid between the member 29 and wall 31 at meniscus 33 and the vacuum built up in the container. Operation of the device is identical to that in FIG. 4. When the balls have been forced to the position shown in FIG. 7 by the beak of the bird as represented by arrow 34, water flow will cease and a meniscus will form at 36. When the bird withdraws its beak because flow has ceased, the balls will return to the position shown in FIG. 12, water will fill the chamber behind the balls and water will cease flowing with only a small drop 37 protruding past the tube opening.

Still another form of the invention is shown in FIGS. 9, 10 and 11. This form of the invention is identical in construction to the previous forms of the invention where identical parts are designated by the letter "b" after the corresponding number. The only difference lies in the formation of the constricted end portion 41 wherein indentations 42 are formed in the tube end forming projections 43. Thus the uneven opening prevents any mechanical seal between the smooth piston member 29b which is identical to member 29 in FIG. 7. FIG. 9 depicts the device in two modes. The dotted lines show the balls in the position in which flow has stopped with meniscus 44 forming to stop flow. The solid lines show the members at the lower most position with the drop of water 45 protruding past the end of the tube and the flow stopped.

FIG. 11 is a graphic representation of the dispensing mode of operation of this unique watering device. The "flying" drops of water 46 and 47 illustrate the fact that the water squirts out of the device when the balls are moving in the direction of arrow 48. Water is not just flowing out of the device it is being forced out of the device under pressure.

I claim:
1. A demand delivery liquid dispensing device for small birds comprising:
 a. a sealed container containing a supply of liquid having a discharge opening in the lower portion of the container below the level of the liquid, said sealed container being capable of maintaining a vacuum;
 b. a cylindrical conduit mounted on an angle and having an inlet connected to said discharge opening in said container and a discharge end positioned at a lower elevation;
 c. an elongated cylindrical means providing a chamber mounted on an angle and having a diameter relatively greater than said conduit and connected thereto at its lower end and the discharge end of said means providing said chamber being formed with opening restricting means;
 d. a first spherical light weight member mounted for free movement within said cylindrical means providing said chamber from a first non-flow position to a second non-flow position and having a diameter dimensioned somewhat smaller than the diameter of said cylindrical means providing said chamber for close fitting relation with the inside walls of said cylindrical means to permit passage of water therebetween during movement from said first to said second position and having a diameter sufficiently large to be constrained by said restricting means from separating from the discharge end of said chamber;

e. said inner walls of said cylindrical means providing said chamber and the surface of said first spherical member being dimensioned for and constructed from materials presenting liquid adhering surfaces producing a meniscus therebetween when said first spherical member is in said first and second positions and at rest and for normally causing liquid to flow therebetween when said first spherical member is moving by being manually forced toward said inlet and away from said discharge end;

f. a spherical ballast member dimensioned to roll within said conduit member and prevent water flow without mechanical seal and having a weight heavier than water for returning said first spherical member to said discharge end when not manually forced toward said inlet;

g. said spherical member and restricting means in said chamber including pressure relief means having means spacing said first spherical member from a portion of said restricting means to prevent mechanical liquid seal therebetween;

h. the first spherical member effectively normally preventing leakage of liquid from said container except upon demand of a small bird by the combination of said vacuum within said sealed container and the surface tension between the surface of said first spherical member and the inside surface of said restricting means;

i. the diameters of said first spherical member and said ballast member being selected to permit entry of said ballast member into said cylindrical means forming said chamber; and j. said elongated cylindrical means forming said chamber having a length so that said first spherical member is moved to a position adjacent the end of said cylindrical means forming said chamber by the beak of a bird using the device so that the bird can move said ballast member into said conduit thereby restricting said conduit and forcing the water trapped between said two spherical members past said first spherical member.

2. A liquid dispensing device as described in claim 1 comprising:

a. said surface of said piston member being formed with an irregular surface to prevent a mechanical seal with said constricted opening in the discharge end of said chamber.

3. A demand delivery device as described in claim 1 comprising:

a. said pressure relief means consisting of forming the discharge end of said chamber with a circular restricted opening and forming crenulations in the periphery of said opening.

4. A demand delivery device as described in claim 1 comprising:

a. said pressure relief means consisting of spaced indentations around the periphery of a cross sectionally reduced area of the discharge end of said chamber.

5. A device as described in claim 3 comprising:

a. said spherical member being formed with a smooth surface.

6. A device as described in claim 1 comprising:

a. said conduit having a restriction preventing movement of the ballast member into the liquid container.

7. A device as described in claim 1 comprising:

a. said first spherical member being dimensioned to protrude beyond the end of the discharge of said chamber.

8. A device as described in claim 1 comprising:

a. said opening restricting means consisting of members integral with the discharge end of said chamber curving inwardly so that the control member will contact said members without wedging.

* * * * *

UNITED STATES PATENT OFFICE
CERTIFICATE OF CORRECTION

Patent No. 3,838,664.              Dated   October 1, 1974

Inventor(s)  Frank W. Atchley

It is certified that error appears in the above-identified patent and that said Letters Patent are hereby corrected as shown below:

Column 8, line 31, after "discharge" insert ---end---

Signed and Sealed this seventeenth Day of February 1976

[SEAL]

Attest:

RUTH C. MASON
Attesting Officer

C. MARSHALL DANN
Commissioner of Patents and Trademarks